United States Patent [19]

Ogawa et al.

[11] Patent Number: 4,563,028

[45] Date of Patent: Jan. 7, 1986

[54] REINFORCEMENT MEMBER FOR A VEHICLE BUMPER

[75] Inventors: Osamu Ogawa, Toyota; Fumio Wakamatsu, Okazaki, both of Japan

[73] Assignee: Aisin Seiki Kabushiki Kaisha, Kariya, Japan

[21] Appl. No.: 508,924

[22] Filed: Jun. 29, 1983

[30] Foreign Application Priority Data

Jul. 1, 1982 [JP] Japan .................. 57-100112[U]

[51] Int. Cl.⁴ .................................... B60R 19/08
[52] U.S. Cl. ................................ 293/122; 293/155
[58] Field of Search ............... 293/102, 109, 120, 121, 293/122, 135, 136, 154, 155

[56] References Cited

U.S. PATENT DOCUMENTS

| | | | |
|---|---|---|---|
| 3,706,468 | 12/1972 | Yovienic | 293/120 |
| 3,869,167 | 3/1975 | Muller | 293/71 R |
| 4,270,787 | 6/1981 | Savell | 293/121 |
| 4,348,042 | 9/1982 | Scrivo | 293/120 |
| 4,361,352 | 11/1982 | Wakamatsu | 293/120 |
| 4,387,920 | 6/1983 | Slaughter et al. | 293/117 |
| 4,391,464 | 7/1983 | Masotti et al. | 293/120 |

Primary Examiner—Randolph A. Reese
Assistant Examiner—Russell D. Stormer
Attorney, Agent, or Firm—Finnegan, Henderson, Farabow, Garrett & Dunner

[57] ABSTRACT

A reinforcement member for a vehicle bumper comprising a hollow and longitudinal reinforcement, at least one open portion formed on the back surface of the reinforcement, at least one recess portion for housing a direction indicator lamp formed on the front surface of the reinforcement by transforming the front surface of the reinforcement against the at least one open portion, and a connection disposed between the back surface of the reinforcement and the at least one recess portion.

6 Claims, 7 Drawing Figures

REINFORCEMENT MEMBER FOR A VEHICLE BUMPER

BACKGROUND OF THE INVENTION

1. Field Of The Invention

The present invention relates to a reinforcement member for a vehicle bumper, and more particularly to a reinforcement member housing a direction indicator lamp without a decrease in the mechanical strength of the bumper.

2. Description Of The Prior Art

Conventional reinforcement members for vehicle bumpers are usually made out of a hollow and longitudinal material, such as by extrusion, to minimize its weight. It is also known to include direction indicator lamps disposed on the side ends of the bumper. The indicator lamps are normally supported by the side ends of the reinforcement member.

Reinforcement members made by extrusion and the like include a cross section along the direction of the vehicle width, and it is therefore necessary to provide an opening on the front surface of the reinforcement member so as to house the direction indicator lamps in the hollow portion of the reinforcement member. Therefore, the mechanical strength of the reinforcement member is decreased in the area of the opening. Such reinforcement members therefore do not completely reinforce the bumper.

SUMMARY OF THE INVENTION

An object of the present invention is to provide an improved reinforcement member for a vehicle bumper which solves the aforementioned drawback of conventional reinforcement members.

A further object of the present invention is to provide an improved reinforcement member which can house a direction indicator lamp without a decrease in the mechanical strength of the reinforcement member.

A still further object of the present invention is to provide an improved reinforcement member which is relatively simple and includes a minimum number of parts.

To achieve the foregoing objects of this invention, a reinforcement member is provided that is hollow and extends longitudinally, that has at least one open portion formed on the back surface thereof, and at least one recess portion for housing a direction indicator lamp formed on the front surface of the reinforcement member by positioning the front surface of the reinforcement member against the open portion, and which has a connecting means disposed between the back surface of the reinforcement and the recess portion of the housing for the direction indicator lamp.

Since the front and back surfaces of the reinforcement member are connected through the connecting means, the mechanical strength in the recess for housing the direction indicator lamp is maximized in accordance with the invention. Moreover, the reinforcement member according to the invention is relatively simple in structure. Further, the front surface of the reinforcement member, to which a bumper having a bumper form and a cover is attached, has no broken portion such as the open portion formed on the back surface of prior art reinforcement members.

BRIEF DESCRIPTION OF THE DRAWINGS

Various other features, objects and attendant advantages of the present invention will become evident when considered in connection with the accompanying drawings wherein.

DETAILED DESCRIPTION OF THE PREFERRED EMBODIMENT

Figure 1:
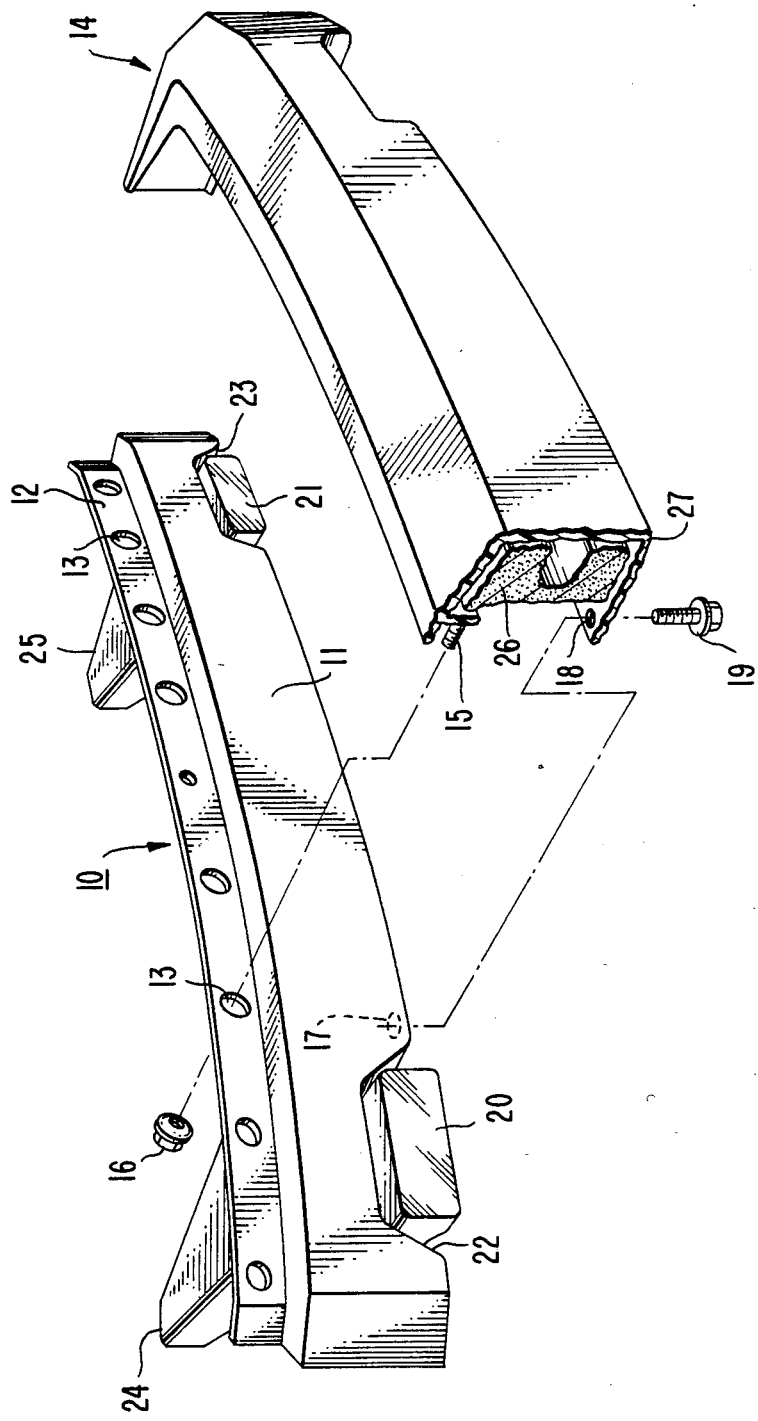
FIG. 1 shows a perspective view of a reinforcement member for a vehicle bumper according to the present invention.

Referring now to FIG. 1, the reference numeral 10 denotes a reinforcement member having reinforcement 11. Reinforcement 11 comprises a hollow and longitudinal material made by extruding aluminum, for example, and provided with a longitudinal rib portion 12 on the upper surface thereof. The rib portion 12 has a plurality of holes 13 and, by screwing bolts 15 to nuts 16 through holes 13, the bumper 14 is attached to the front surface of reinforcement 11. Bolts 19 are respectively screwed to blind nuts 17 fixed in reinforcemen 11 through holes 18 which are formed on the lower surface of bumper 14 so as to attach the bumper to reinforcement 11. A pair of recesses 48, 49 for respectively housing direction indicator lamps 20, 21 are formed on the lower part of each side end of the front surface of reinforcement 11. A pair of struts 24, 25 is secured to the back surface of reinforcement 11. Bumper 14 comprises a urethane foam member 26, for example, and a bumper cover 27 (made of plastic, for example) covering member 26.

Figure 2:
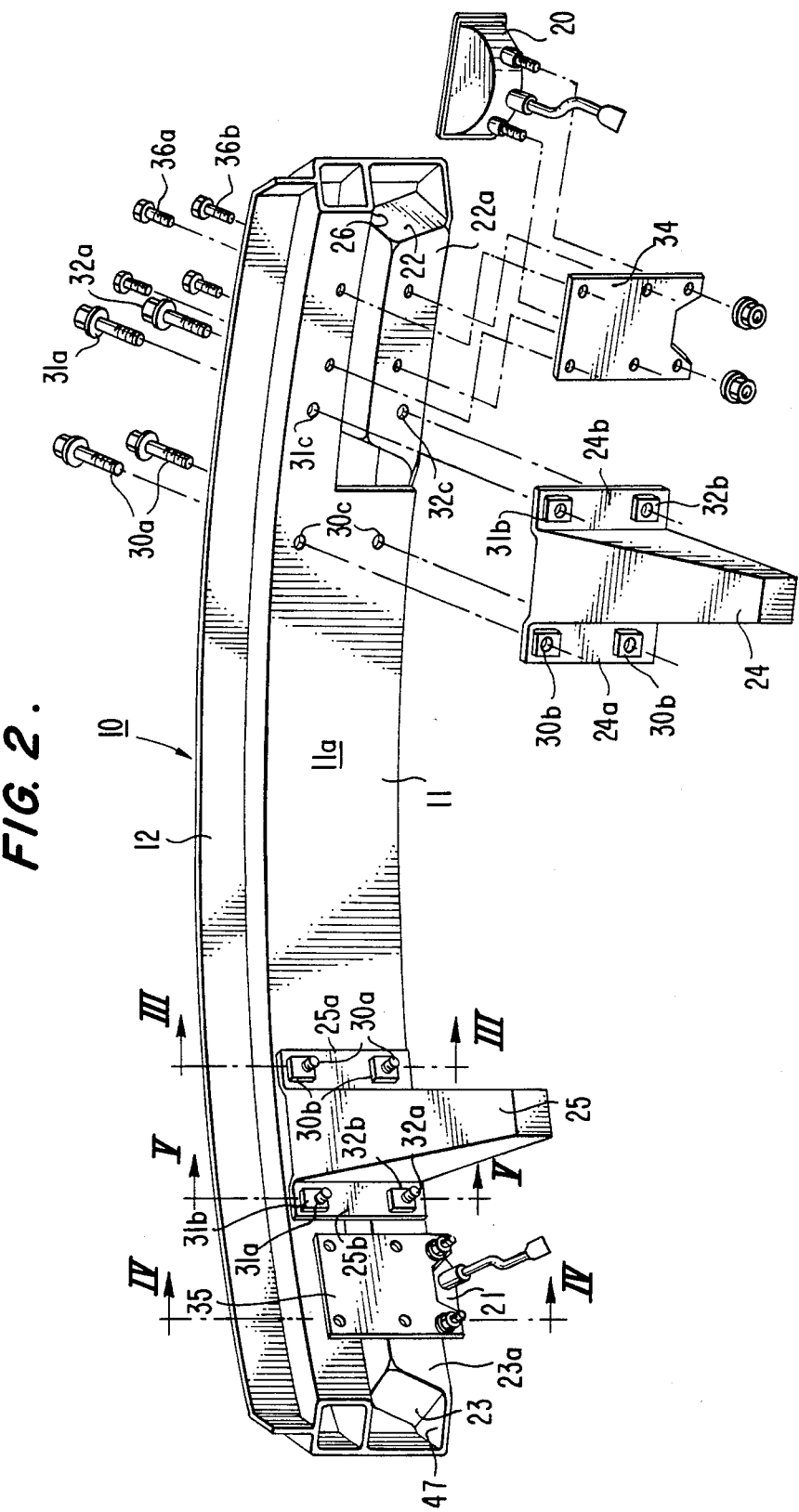
FIG. 2 shows another perspective view of the reinforcement member shown in FIG. 1.
Figure 3:
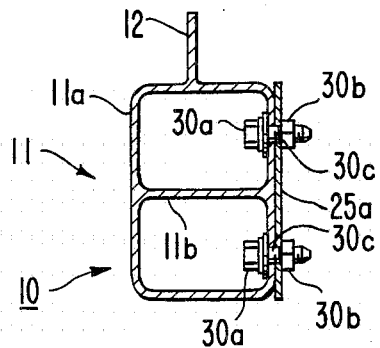
FIG. 3 shows a cross-sectional view along section lines III—III of FIG. 2.

The reinforcement member 10 thus comprises reinforcement 11, part of struts 24, 25 and a pair of brackets 34, 35 as shown in FIG. 2. Reinforcement 11 is slightly bent along the longitudinal direction so as to conform to the front shape of the vehicle (not shown). The hollow portion 11a of reinforcement 11 is provided with a transverse rib 11b for increasing the mechanical strength of the hollow portion 11a (FIG. 3).

Figure 4:
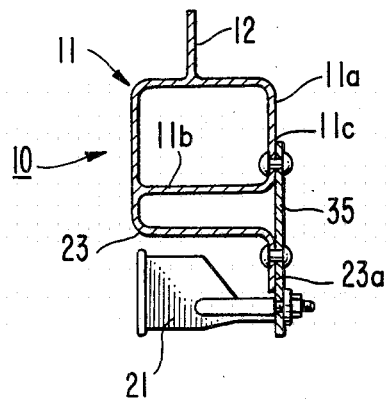
FIG. 4 shows a cross-sectional view along section lines IV—IV of FIG. 2.

A pair of rectangular openings 46, 47 are provided on each end of the back surface (facing the vehicle) of reinforcement 11 by punching or cutting. Portions of the front surface (facing the bumper 14) of reinforcement 11 are opposite to openings 46, 47 so that a pair of recesses 48, are 49 respectively formed on housing portions 22, 23 for housing the direction indicator lamps 20, 21. Each back end portion 22a, 23a of each of housing portions 22, 23 is positioned at the same location with the back surface 11c of the reinforcement 11 in the vertical direction (FIG. 4).

The brackets 34, 35, which operate as a connecting means, are disposed between the back surface 11c of reinforcement 11 and the back end portions 22a, 23a of housing portions 22, 23 and supports the direction indicator lamps 20, 21 in the housing portions 22, 23. The upper end portion of the brackets 34, 35 is connected to the back surface 11c of reinforcement 11 by rivets 36a, and the middle portion of the brackets 34, 35 is connected to the back ends 22a, 23a by rivets 36b. The direction indicator lamps 20, 21 are provided in the lower portion of brackets 34, 35 and are housed in the housing portions 22, 23 of reinforcement 11.

Figure 5:
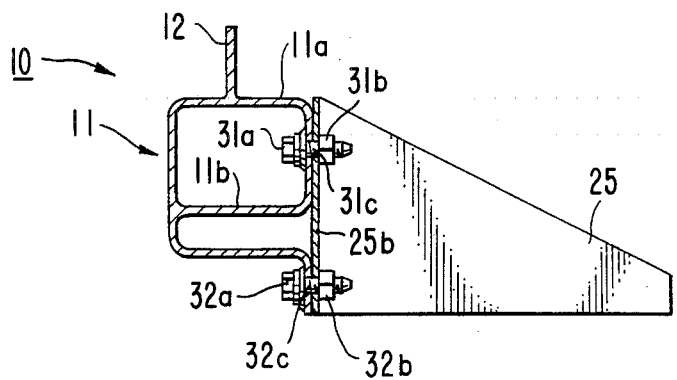
FIG. 5 shows a cross-sectional view along section lines V—V of FIG. 2.

Inner side base portions 24a, 25a of each strut 24, 25 are secured to the hollow portion 11a of reinforcement 11 by screwing bolts 30a to the welded nuts 30b fixed on inner side base portions 24a, 25a of struts 24, 25 through holes formed on reinforcement 11. Also, an upper portion of outer side base portions 24b, 25b of struts 24, 25 is secured to reinforcement 11 by screwing bolts 31a to a welded nut 31b fixed on the outer side base portions 24b, 25b of struts 24, 25 through holes 31c formed on reinforcement 11. A lower portion of the outer side base portions 24b, 25b of struts 24, 25 is secured to reinforcement 11 by screwing bolts 32a to welded nuts 32b fixed on the outer side base portions 24b, 25b of struts 24, 25 through holes 32c formed on reinforcement 11 (FIG. 5). Thus, the outer side base portions 24b, 25b of struts 24, 25 operates as a connecting means connecting between the back surface 11c of the reinforcement 11 and the back ends 22a, 23a as well as the brackets 34, 35.

Figure 7:
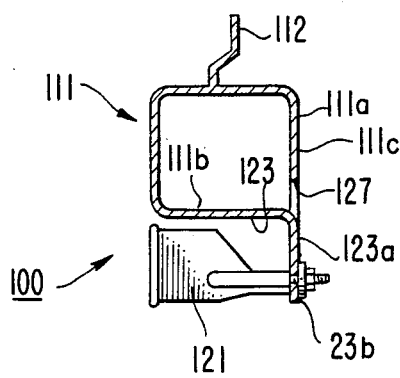
FIG. 7 shows a cross-sectional view along section lines VII—VII of FIG. 6.
Figure 6:
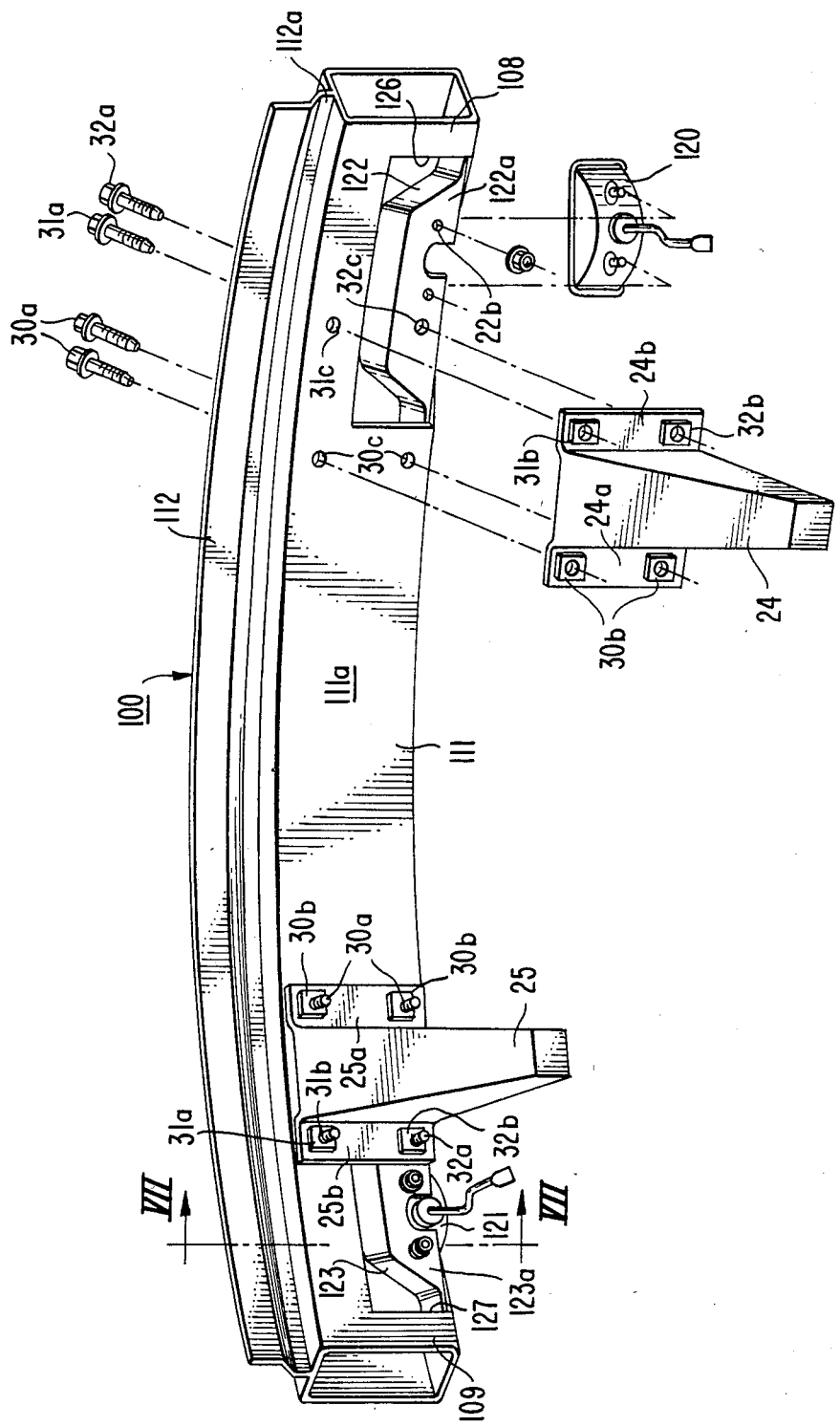
FIG. 6 shows a perspective view of another embodiment according to the present invention.

FIGS. 6 and 7 show another embodiment of the reinforcement member (111) and a pair of struts 24, 25. The reinforcement 111 is bent so as to conform to the front shape of the vehicle (not shown), and the longitudinal rib portion 112, which is provided on hollow portion 111a, is bent so as to conform to the shape of the bumper (not shown). Thus, a bent portion 112a exists in the lower portion 112 and the hollow portion 111a because of the difference between the front shape of the vehicle and the shape of the bumper.

A pair of rectangular openings 126, 127 are provided on each end of the back surface 111c of reinforcement 111 on edge portions 108, 109. The front surface opposite to each opening 126, 127 is transformed against the openings so that a pair of recesses 122, 123 for housing the direction indicator lamps 120, 121 are formed. As shown in FIG. 7, the back ends 122a, 123a are positioned at the same location with the back surface 111c of reinforcement 111 in the vertical direction. Further, the direction indicator lamps 120, 121 are directly connected in the back ends 122a, 123a. A pair of struts 24, 25 are connected to reinforcement 111, just as in the embodiments shown in FIGS. 2 and 5.

As mentioned above, the openings 46, 47 and 126, 127 formed in the hollow portions 11a, 111a of reinforcement 11, 111 shape recesses 48, 49, 122, 123 for housing the direction indicator lamps 20, 21, 120, 121. The lamps are connected by the struts 24, 25 and the brackets 34, 35, or by the edge portions 108, 109 of reinforcement 111, and the greater part of the openings 46, 47, 126, 127 are therefore closed. Thus, reinforcement 11, 111 has sufficient mechanical strength in spite of having recesses 48, 49, 122, 123, particularly at the portion of openings 46, 47 and 126, 127.

It will be understood by those skilled in the art that other uses of reinforcement members in accordance with the invention may be made, and that numerous variations and modifications may be effected to the preferred embodiment without departing from the spirit and scope of the invention claimed.

What is claimed:

1. A reinforcement member for a vehicle bumper comprising:
 a hollow and longitudinal reinforcement,
 at least one opening formed on the back surface of the reinforcement,
 at least one recess portion housing a direction indicator lamp formed on the front surface of the reinforcement by positioning the front surface of the reinforcement against said at least one opening, and
 connecting means fixed to the back surface of the reinforcement and to said at least one recess portion and substantially closing said at least one opening, and the direction indicator lamp being connected to the connecting means.

2. A reinforcement member for a vehicle bumper as set for in claim 1, wherein there are two openings, one each being disposed on the back surface of each end of the reinforcement, and where the connecting means substantially closes the two openings and is fixed to the reinforcement and said at least one recess portion.

3. A reinforcement member for a vehicle bumper as set forth in claim 1, wherein there are two recess portions, one each being disposed on the front surface of each end of the reinforcement, and wherein the connecting means is fixed to the reinforcement and the two recess portions.

4. A reinforcement member for a vehicle bumper as set forth in claim 1, wherein the connecting means is an edge portion formed on the back surface end of the reinforcement.

5. A reinforcement member for a vehicle bumper as set forth in claim 1, wherein the connecting means is a bracket for supporting the direction indicator lamps.

6. A reinforcement member for a vehicle bumper as set forth in claim 1, wherein the connecting means is a strut for securing the reinforcement to the vehicle body.

* * * * *